April 20, 1943.  E. R. BERGMANN  2,317,172
FEEDING MECHANISM FOR SHAKER CONVEYERS
Filed Sept. 18, 1941  3 Sheets-Sheet 1

INVENTOR.
Ernst R. Bergmann
BY
Clarence T. Bale
ATTY.

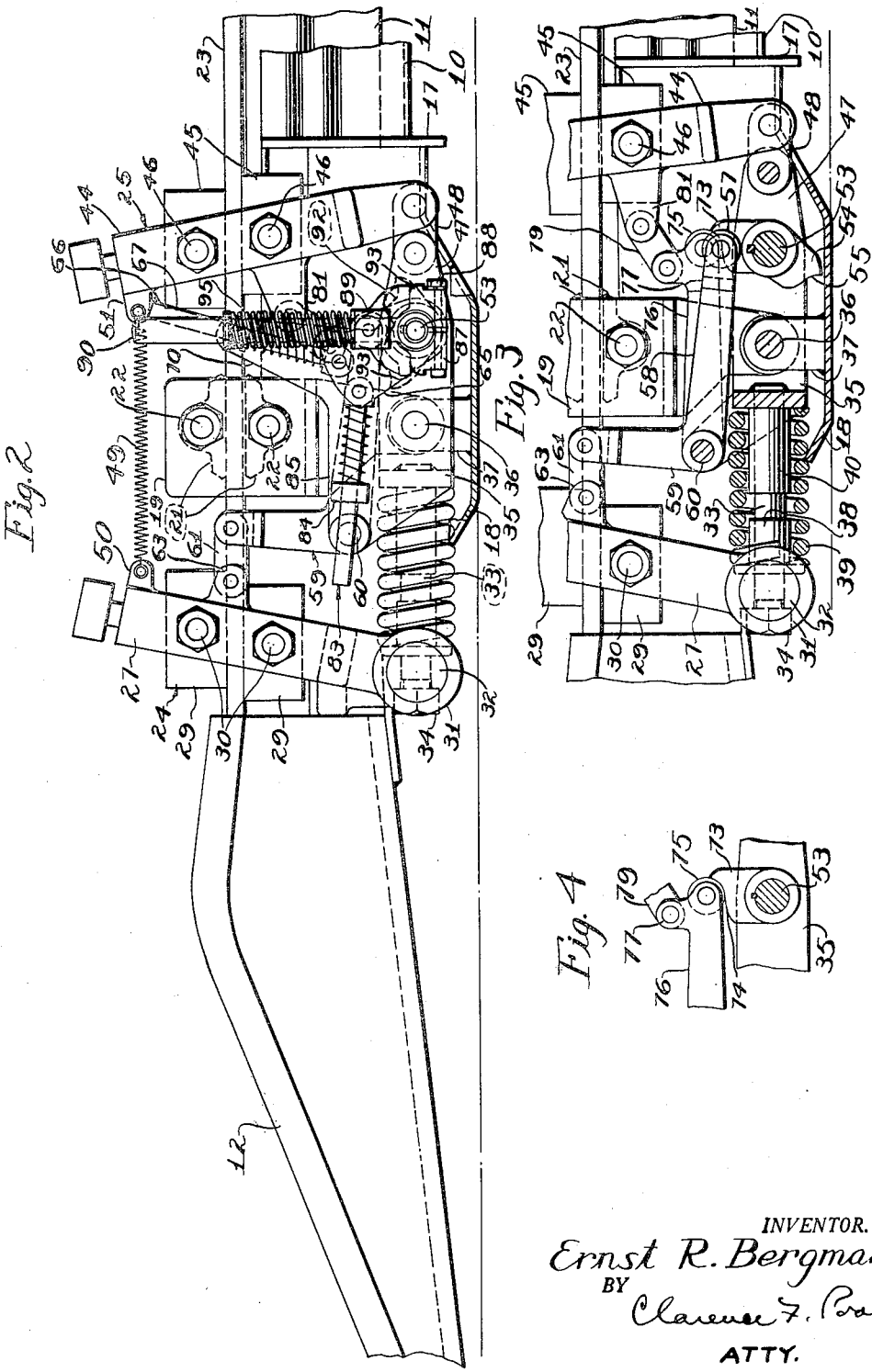

April 20, 1943. E. R. BERGMANN 2,317,172
FEEDING MECHANISM FOR SHAKER CONVEYERS
Filed Sept. 18, 1941 3 Sheets-Sheet 3

INVENTOR.
Ernst R. Bergmann
BY
Clarence F. Poole
ATTY.

Patented Apr. 20, 1943

2,317,172

UNITED STATES PATENT OFFICE 2,317,172

FEEDING MECHANISM FOR SHAKER CONVEYERS

Ernst R. Bergmann, Evergreen Park, Ill., assignor to Goodman Manufacturing Company, Chicago, Ill., a corporation of Illinois Application September 18, 1941, Serial No. 411,386

14 Claims. (Cl. 198—220)

This invention relates to improvements in feeding mechanisms for shaker conveyers of the type utilized for picking up and transporting loose material such as coal, rock, or the like.

The principal objects of my invention are to provide a novel and simplified form of feeding device of the friction grip type adapted to automatically extend or retract an extensible trough section of a shaker conveyer solely by reciprocable movement of the conveyer in a more efficient manner than formerly, and including a pair of opposed gripping devices on each side of the conveyer, each of which are normally in a gripping position and either one of which may be released, to permit the other to effect feeding of the extensible trough section.

Other objects of my invention will appear from time to time as the following specification proceeds and with reference to the accompanying drawings wherein:

Figure 2 is a view in side elevation of the device shown in Figure 1, with certain parts shown in longitudinal section;

Figure 3 is a fragmentary detail side elevational view of the feeding device, drawn to substantially the same scale as Figure 2, but with certain other parts broken away and shown in section than in Figure 2;

Figure 4 is an enlarged detail view showing certain details of the cam arrangement, for releasing one of the gripping devices;

Figure 1:
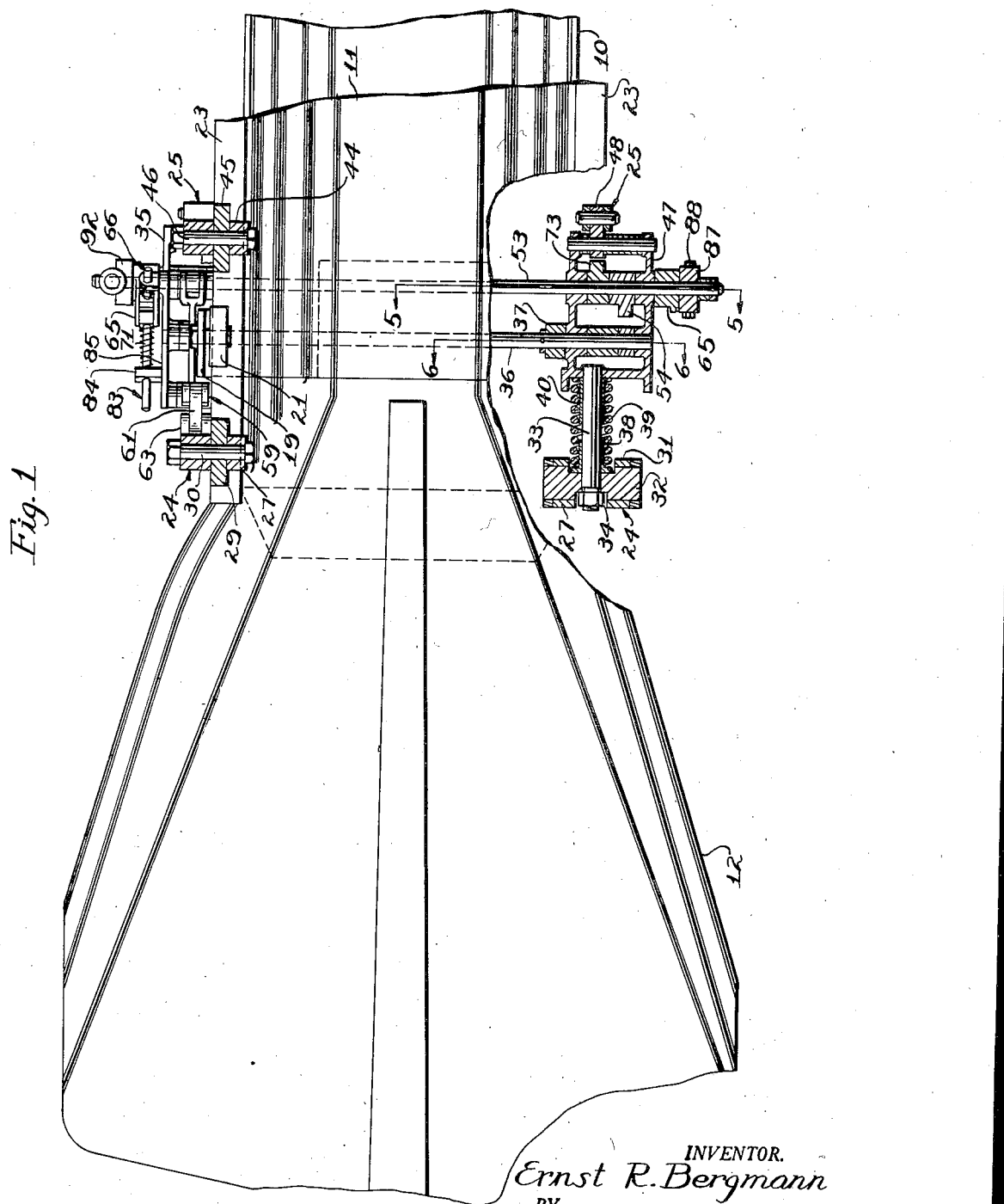
Figure 1 is a plan view of the loading end of a shaker conveyer trough line having a feeding device constructed in accordance with my invention associated therewith, with certain parts broken away and certain other parts in horizontal section.
Figure 5:
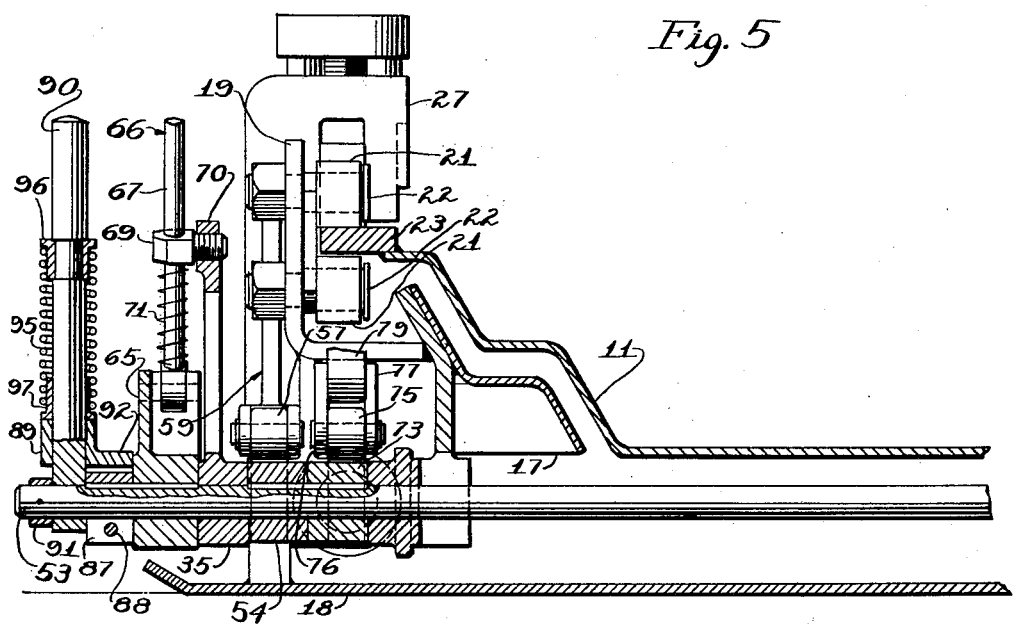
Figure 5 is an enlarged fragmentary transverse sectional view taken substantially along line 5—5 of Figure 1.
Figure 7:
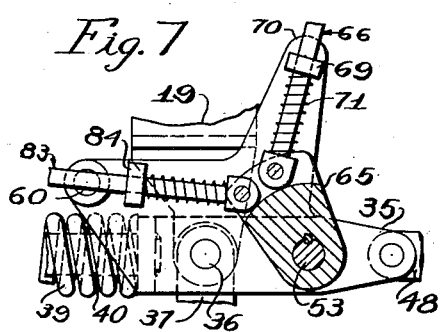
Figure 7 is an enlarged detail view, showing certain details of the means for holding the gripping means in a released position.
Figure 6:
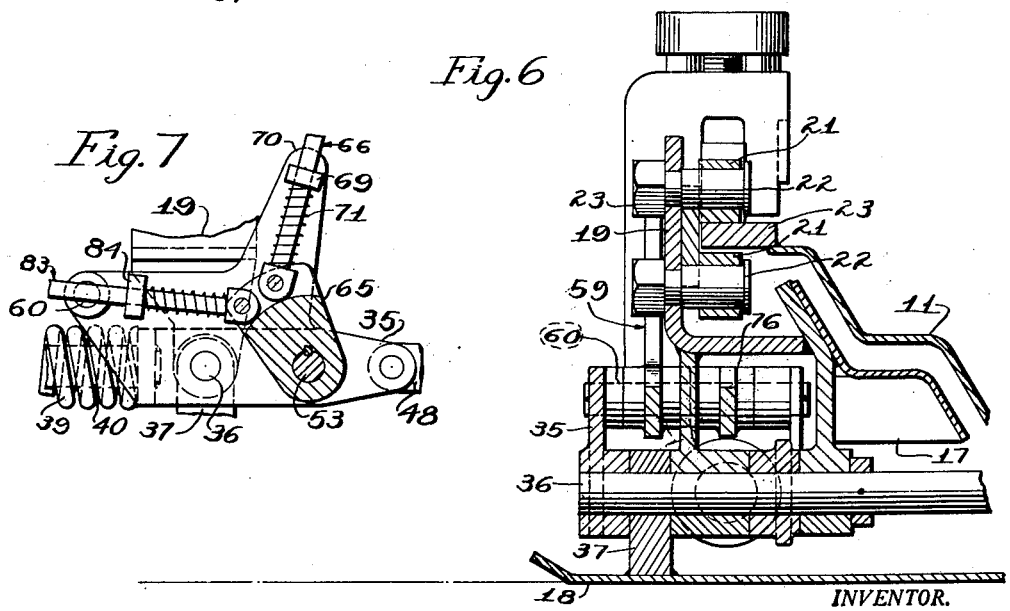
Figure 6 is a fragmentary transverse sectional view drawn to the same scale as Figure 5 and taken substantially along line 6—6 of Figure 1.

In the embodiment of my invention illustrated in the drawings, the main elements thereof include a reciprocating trough section 10 connected to the forward end of the shaker conveyer trough line and reciprocably driven thereby (not shown). An extensible trough section 11 having a flared gathering shovel 12 on its forward end is mounted for telescopic extension or retraction with respect to said reciprocating trough section.

The extensible trough section 11 is slidably supported on the ground at its forward end on the forward end of the shovel 12 and may be supported above the ground at its rear end on a suitable supporting shoe, in a manner similar to that illustrated in my prior Patent No. Re. 21,027 and no part of my present invention so not herein shown or described.

The reciprocating trough section 10 is provided with a forwardly projecting frame member 17, which includes a protecting shoe 18 extending in advance of said reciprocating trough section and adapted to protect the feeding mechanism when irregularities on the ground are encountered. Said shoe is normally out of engagement with the ground and serves to prevent rocks or other irregularities on the ground from injuring the feeding mechanism. A pair of bracket members 19, 19 projects laterally from opposite sides of said frame member adjacent the forward end of said reciprocating trough section. Each of said bracket members has a pair of vertically spaced bearing blocks 21, 21 pivotally mounted thereon on pivotal pins 22, 22. Said bearing blocks are adapted to extend above and below bearing plates 23, 23 projecting laterally from opposite sides of said extensible trough section, to form a guide means for said extensible trough section along said reciprocating trough section and to prevent vertical displacement of said trough sections with respect to each other.

Referring now in particular to certain novel features of my invention and the means for extending or retracting said extensible trough section relative to said reciprocating trough section, two pairs of gripping devices 24 and 25 are provided, one of which pairs is opposed to the other. Said gripping devices extend along opposite sides of said extensible trough section and the gripping devices 24, 24 are adapted to extend said extensible trough section from said reciprocating trough section while the gripping devices 25, 25, which are opposed to said first mentioned gripping devices, are adapted to retract said extensible trough section within said reciprocating trough section. The arrangement and construction of said gripping devices on each side of the extensible trough section 11 is the same, so said gripping devices on one side only of said trough section will be described herein.

The gripping device 24 includes an inclined carrier member 27, inclined upwardly towards the rear of said extensible trough section. Said carrier member has an upper portion which is of a substantially C-shaped formation and the open portion thereof extends above and below the bearing plate 23. A pair of friction grip blocks 29, 29 is pivotally mounted in said carrier member above and below the open portion thereof on pivotal pins 30, 30 in such a manner that pressure on the lower end of said carrier member in a direction towards the shovel 12 will cause said grip blocks to grip said bearing plate 23. Said carrier member is provided with an enlarged boss 31 at its lower end, which has a pin 32 pivotally mounted therein. A rod 33 is slidably mounted in said pin and extends horizontally therefrom and perpendicular to the longitudinal axis of said pin. Movement of said rod relative to said pin is limited by means of a nut 34. Said rod is secured to and projects forwardly from a forward end wall of a support member 35, for said carrier member, which support member is pivotally mounted on the shoe 18 on a transverse shaft 36, mounted in bracket members 37, 37, projecting upwardly from the top side of said shoe. A flanged sleeve 38 encircles said rod and the flange thereof abuts a recessed portion of said pin and is abutted at its opposite side by one end of a compression spring 39. Said compression spring encircles said sleeve and also encircles a sleeve 40, mounted on said rod and abutting a forward end wall of the support member 35. Said rod and compression spring thus form a yieldable link which serves to move the lower end of said carrier member in a forward direction upon the forward stroke of the conveyer to engage the grip blocks 29, 29 with the bearing plate 23 and to exert a pulling action against said carrier member upon the return stroke of the conveyer, to disengage said grip blocks from said bearing plate. Also, when the shovel 12 engages an obstruction during the forward stroke of the conveyer, said spring will yield to permit rearward movement of the lower end of said carrier member along said rod, and permit the grip blocks 29, 29 to be released from the bearing plate 23, to prevent damage to the parts of the feeding mechanism.

The gripping device 25 includes a carrier member 44 inclined in a direction opposite to the carrier member 27 and having a pair of grip blocks 45, 45 pivotally mounted thereon, on pivotal pins 46, 46. Said grip blocks are adapted to be engaged with opposite sides of the bearing plate 23 during the return stroke of the conveyer. Said carrier member is pivotally connected to a rearwardly projecting portion 47 of the support member 35 by means of a link 48 pivotally connected to the lower end of said carrier member at one of its ends and to the projecting portion 47 of said support member at its opposite end.

A tension spring 49 connects a lug 50 projecting rearwardly from the upper end of the carrier member 27 with a lug 51 projecting forwardly from the upper end of the carrier member 44, to urge said carrier members in position to cause the grip blocks 29, 29 to grip the bearing plate 23 at the beginning of the forward stroke of the conveyer, and to cause the grip blocks 45, 45 to grip the bearing plate 23 at the beginning of the return stroke of the conveyer.

Referring now in particular to the means for moving the carrier member 27 to a position to cause disengagement of the grip blocks 29, 29 from the bearing plate 23, during the forward and return strokes of the conveyer, a transverse shaft 53 is pivotally mounted in opposite support members 35, 35, rearwardly of the shaft 36, and projects beyond the outer sides of said support members. A cam 54 is keyed to said shaft and has an engaging surface 55 adapted to engage a roller 57 on the outer end of a lever arm 58 of a bell crank 59. Said bell crank is pivotally mounted in the support member 35 on a transverse shaft 60. A link 61 connects the other arm of said bell crank with a lug 63, projecting rearwardly from the carrier member 27.

A sector 65 is keyed on the transverse shaft 53, just outside of the support member 35, and projects upwardly therefrom and has one end of a yieldable link 66 pivotally connected thereto. Said yieldable link includes a rod 67 slidably extending through a guide member 69, threaded in an upwardly projecting and rearwardly inclined arm 70 of the support member 35, and pivotally movable with respect to said arm. A compression spring 71 encircles said rod and abuts said guide member, to urge said sector into a forwardly inclined position and to move the cam 54 in a direction away from the roller 57, so that the grip blocks 29, 29 will be in an engaged position except when the cam 54 is manually moved to engage the roller 57 and move the carrier member 27 to a position to cause disengagement of the grip blocks 29, 29 from their respective bearing plates during both the forward and return strokes of the conveyer.

The grip blocks 45, 45 are released from the bearing plate 23 upon the return stroke of the conveyer by means of a cam 73, keyed to the transverse shaft 53, adjacent the cam 54. Said cam is provided with an engaging surface 74 adapted to engage a roller 75 on the outer end of a lever arm 76, pivotally mounted on the transverse shaft 60. An arm 77 projects upwardly from the lever arm 76 adjacent its outer end. A link 79 pivotally connects the upper end of this arm to a lug 81, projecting forwardly from the carrier member 44, just below the bearing plate 23. Thus when the engaging surface 74 of the cam 73 has engagement with the roller 75 and said cam is in the upwardly projecting position shown in Figure 3, the lever arm 76 and link 79 will cause movement of the carrier member 44 in a rearward direction about the link 48 a distance sufficient to cause the grip blocks 45, 45 to be disengaged from the bearing plate 23 during both the forward and return strokes of the conveyer. A yieldable link 83 is pivotally connected to an upper end of the sector 65 on the end thereof opposite from the point of connection of the yieldable link 66 thereto, to move the cam 73 to a disengaged position and to hold said cam in such a position except upon manual operation of the shaft 53. Said yieldable link is similar to the yieldable link 66 and is slidably guided in a guide member 84, herein shown as being threaded within an outer side wall 85 of the support member 35.

The means for operating the cams 54, 54 and 73, 73 includes a pair of operating members 87, 87 keyed on opposite ends of the transverse shaft 53, to permit operation of the device from either side thereof. The lower portions of said operating members are slotted to permit ready insertion on said shaft, and said members are each secured to said shaft by means of a nut and bolt indicated by reference character 88. An engaging member 89 is slidably mounted on a hand lever 90, which is pivotally mounted on the shaft 53, and which is retained on said shaft by means of a collar 91. Each of said engaging members has an inwardly projecting portion 92 adapted to engage opposite projecting engaging portions 93, 93 of the operating member 87 and to pivot the shaft 53, by engagement with said engaging portions.

The engaging member 89 is yieldably engaged with the engaging portions 93, 93 of the operating member 87 by means of a compression spring 95, encircling the handle 90, and interposed between a flanged sleeve 96 mounted on said handle adjacent the upper end thereof, and a flanged sleeve 97, slidably mounted on said handle and engaging said engaging member. Thus, any sudden thrusting actions transmitted to the shaft 53 by the grip blocks 29, 29 or 45, 45 will be taken by the springs 95, 95, which will absorb said shocks and prevent them from being transmitted to the hand levers 90, 90 and the hand of the operator.

It may be seen from the foregoing that when hand pressure is relieved from either operating handle 90, the yieldable links 66 and 83 will move the respective cams 54 and 73 out of engagement with the rollers 57 and 75, respectively, so both sets of grip blocks 29, 29 and 45, 45 will engage the bearing plates 23, 23, to cause movement of the extensible trough section with the reciprocating trough section.

The extensible trough section is extended by applying hand pressure to the operating handle 90, and moving the shaft 53 and cams 73, 73 in a counterclockwise direction, to engage the rollers 75, 75 with the engaging surfaces 74, 74 of said cams. This will pivot the lever arms 76, 77 in an upward direction and will move the carrier members 44, 44 in a position to cause the grip blocks 45, 45 to be disengaged from the bearing plates 23, 23, during the forward and return strokes of the conveyer, and cause the grip blocks 29, 29 to be engaged with the bearing plates 23, 23, during the forward strokes of the conveyer by the yieldable links formed by the rod 33 and spring 39 and to be released therefrom during the return strokes of the conveyer by the pulling action of said links on the lower ends of said carrier members. This will pivot said carrier members in a direction to disengage said grip blocks from said bearing plates.

The extensible trough section 11 is retracted within the reciprocating trough section by moving the hand lever 90 in a clockwise direction from the position just described. This will move the cams 73, 73 away from the rollers 75, 75 to permit the lever arms 76, 76 to move in a downward direction and to permit the grip blocks 45, 45 to move to a position to grip the bearing plates 23, 23 during the return stroke of the conveyer. Further movement of said lever arms will cause the cams 54, 54 to engage the rollers 57, 57 to pivot the bell cranks 59, 59 in a counterclockwise direction and move the carrier members 27, 27 and grip blocks 29, 29 to a released position. When said hand lever is in this position and pressure is maintained thereon, the grip blocks 45, 45 and the carrier members 44 will retract the extensible trough section within the reciprocating trough section by engagement of the grip blocks 45, 45 with the bearing plates 23, 23 during the return strokes of the conveyer and disengagement of said grip blocks from said bearing plates during the forward strokes of the conveyer.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a feeding device for shaker conveyers, two trough sections, one of which is extensible with respect to the other, and means for extending or retracting said extensible trough section with respect to said other trough section including two opposed carrier members connected with one trough section adjacent their lower ends and having gripping means carried thereby and adapted to have gripping engagement with the other trough section, means for urging each of said carrier members to a gripping position, to cause reciprocable movement of one trough section with the other, and selectively operable control means operatively connected with each of said carrier members above their lower ends, for moving either of said carrier members to a released position, to permit said other carrier member to cause movement of said extensible trough section relative to said other trough section.

2. In a feeding device for shaker conveyers, two trough sections, one of which is extensible with respect to the other, means for extending or retracting said extensible trough section with respect to the other including two opposed carrier members, gripping means carried by each carrier member, means for urging said carrier members to a position to cause their associated gripping means to grip one trough section during certain strokes of the conveyer for reciprocably moving said extensible trough section with the other trough section, and manually operable means for moving either of said carrier members to a released position, to permit the gripping means of said other carrier member to grip one trough section during certain strokes of the conveyer, and to be released therefrom during the opposite strokes of the conveyer, to cause extension or retraction of said extensible trough section.

3. In a feeding device for shaker conveyers, two trough sections, one of which is extensible with respect to the other, means for extensibly or retractibly moving said extensible trough section with respect to the other including two opposed carrier members connected with one of said trough sections, gripping means carried by each of said carrier members and adapted to have gripping engagement with said other trough section, means for urging each of said carrier members to a gripping position, to cause reciprocable movement of one trough section with the other, and manually operable cam means for moving either of said carrier members to a released position, to permit the gripping means of said other carrier member to grip one trough section during certain strokes of the conveyer, and to be released from said trough section during certain other strokes of the conveyer, to cause extension or retraction of said extensible trough section.

4. In a feeding device for shaker conveyers, two trough sections, one of which is extensible with respect to the other, means for extensibly or retractibly moving said extensible trough section with respect to the other including two opposed carrier members connected with one of said trough sections, gripping means carried by said carrier members and adapted to have gripping engagement with said other trough section, means for urging each of said carrier members to a gripping position, to cause reciprocable movement of one trough section with the other, and manually operable cam means for moving either one of said carrier members to a released position, to permit the gripping means carried by said other carrier member to grip said other trough section during certain strokes of the conveyer, and to be released from said trough section during certain other strokes of the conveyer including a pair of cams and a crank and link connection between said cams and carrier members.

5. In a feeding device for shaker conveyers, a reciprocating trough section, an extensible trough section, means reciprocably driven by said reciprocating trough section and having engagement with said extensible trough section, for moving said extensible trough section relative to said reciprocating trough section including a frame, two opposed carrier members connected with said frame adjacent their lower ends, each of said carrier members having a pair of grip blocks carried thereby and adapted to have gripping engagement with said extensible trough section during certain strokes of the conveyer, and means connected between said frame and said carrier members, above the lower ends thereof, for moving either one of said carrier members and its associated grip blocks to a disengaged position, to permit said other carrier member and grip blocks to be engaged with said extensible trough section during certain strokes of the conveyer and to be released therefrom during certain other strokes of the conveyer, to move said extensible trough section relative to said reciprocating trough section in one direction.

6. In a feeding device for shaker conveyers, a reciprocating trough section, an extensible trough section, means reciprocably driven by said reciprocating trough section and having engagement with said extensible trough section, for moving said extensible trough section relative to said reciprocating trough section including two opposed carrier members, each of said carrier members having a pair of grip blocks carried thereby and adapted to have gripping engagement with said extensible trough section during certain strokes of the conveyer, means connected between said carrier members, for normally holding said carrier members and grip blocks in a gripping position, means pivotally connecting the lower ends of said carrier members with said reciprocating trough section, and manually operable means connected with said carrier members, intermediate the ends thereof, and independently operable to move either one of said carrier members and grip blocks to a disengaged position with respect to said extensible trough section.

7. In a feeding device for shaker conveyers, a reciprocating trough section, an extensible trough section, means reciprocably driven by said reciprocating trough section and having engagement with said extensible trough section, for moving said extensible trough section relative to said reciprocating trough section including two opposed carrier members, each of said carrier members having a pair of grip blocks carried thereby and adapted to have gripping engagement with said extensible trough section during certain strokes of the conveyer, means for yieldably holding said carrier members and grip blocks in a gripping position, and manually operable cam means operable to move either of said carrier members and grip blocks to a disengaged position with respect to said extensible trough section.

8. In a feeding device for shaker conveyers, a reciprocating trough section, an extensible trough section, means reciprocably driven by said reciprocating trough section and having engagement with said extensible trough section, for moving said extensible trough section relative to said reciprocating trough section including two opposed carrier members, each of said carrier members having a pair of grip blocks adapted to have gripping engagement with said extensible trough section during certain strokes of the conveyer, means for holding said carrier members and grip blocks in a gripping position, and manually operable means independently operable to move either of said carrier members and grip blocks to a disengaged position with respect to said extensible trough section including a transverse shaft, cam means on said shaft, two lever arms adapted to be rocked by said cam means, and linkage connections between said lever arms and respective of said carrier members.

9. In a feeding device for shaker conveyers, a reciprocating trough section, an extensible trough section, means reciprocably driven by said reciprocating trough section and having engagement with said extensible trough section, for moving said extensible trough section relative to said reciprocating trough section including a protecting shoe extending in advance of said reciprocating trough section, a pair of opposed carrier members pivotally connected with said shoe and having gripping means carried thereby adapted to have gripping engagement with said extensible trough section, means for yieldably holding each of said carrier members in a gripping position, and control means connected with said carrier members, intermediate the ends thereof, and manually operable to independently move either one of said carrier members in a position to cause release of its associated gripping means from said extensible trough section, to permit the other carrier member to move said extensible trough section relative to said reciprocating trough section.

10. In a feeding device for shaker conveyers, a reciprocating trough section, an extensible trough section, means reciprocably driven by said reciprocating trough section and having engagement with said extensible trough section, for moving said extensible trough section relative to said reciprocating trough section including a protecting shoe extending in advance of said reciprocating trough section above the ground, a pair of opposed carrier members carried by said shoe and having gripping means carried thereby adapted to have gripping engagement with said extensible trough section, means for yieldably holding each of said carrier members in a gripping position, and means manually operable to independently move either one of said carrier members in a position to cause release of said gripping means from said extensible trough section, to permit the other carrier member to move said extensible trough section relative to said reciprocating trough section and including a hand lever and cam means operated by said lever and having operative connection with said carrier members.

11. In a feeding device for shaker conveyers, a reciprocating trough section, an extensible trough section, a protecting shoe extending in advance of said reciprocating trough section, and means pivotally mounted on said shoe and adapted to have engagement with said extensible trough section for moving said extensible trough section relative to said reciprocating trough section including a pair of opposed carrier members having gripping means carried thereby and adapted to engage said extensible trough section, a support member transversely pivoted to said shoe, a link pivotally connecting one end of said support member with one of said carrier members and another link pivotally connecting said support member with said other carrier member, and separate control means connected between said support member and said carrier members, intermediate the ends thereof, for independently moving either of said carrier members to a released position.

12. In a feeding device for shaker conveyers, a reciprocating trough section, an extensible trough section, a protecting shoe extending in advance of said reciprocating trough section, and means pivotally mounted on said shoe and adapted to have engagement with said extensible trough section for moving said extensible trough section relative to said reciprocating trough section including a pair of opposed carrier members having gripping means carried thereby and adapted to engage said extensible trough section, a support member transversely pivoted to said shoe, a link pivotally connecting one end of said support member with one of said carrier members and another link pivotally connecting said support member with said other carrier member, both of said links being adapted to exert a force on their respective carrier members to cause the gripping means carried thereby to grip said extensible trough section during certain strokes of the conveyer, separate control means connected between said support member and said carrier members, above the lower ends thereof, for independently moving either of said carrier members to a released position, and said link which urges its associated carrier member to a gripping position during the forward stroke of the conveyer being yieldable, to permit release of the gripping means carried by said associated carrier member, when said extensible trough section is engaged with an obstruction during the forward stroke of the conveyer.

13. In a feeding device for shaker conveyers, a reciprocating trough section, an extensible trough section, a protecting shoe extending in advance of said reciprocating trough section, and means pivotally mounted on said shoe and adapted to have engagement with said extensible trough section for moving said extensible trough section relative to said reciprocating trough section including a pair of opposed carrier members having gripping means carried thereby and adapted to engage said extensible trough section, a support member transversely pivoted to said shoe, a link pivotally connecting one end of said support member with one of said carrier members and another link pivotally connecting said support member with said other carrier member, both of said links being adapted to exert a force on their respective carrier members to cause the gripping means carried thereby to grip said extensible trough section during certain strokes of the conveyer, and means carried by said pivoted support for moving either of said carrier members to a position to render the thrusting actions imparted thereto by their associated links incapable of engaging said gripping means with said extensible trough section.

14. In a feeding device for shaker conveyers, a reciprocating trough section, an extensible trough section, a protecting shoe extending in advance of said reciprocating trough section, and means pivotally mounted on said shoe and adapted to have engagement with said extensible trough section for moving said extensible trough section relative to said reciprocating trough section including a pair of opposed carrier members having gripping means carried thereby and adapted to engage said extensible trough section, a support member transversely pivoted to said shoe, a link pivotally connecting one end of said support member with one of said carrier members and another link pivotally connecting said support member with said other carrier member, both of said links being adapted to exert a force on their respective carrier members to cause the gripping means carried thereby to grip said extensible trough section during certain strokes of the conveyer, and means carried by said pivoted support for moving either of said carrier members to a position to render the thrusting actions imparted thereto by their associated links incapable of engaging said gripping means with said extensible trough section including manually operable cam means, lever arms actuated thereby, and linkage connections between respective of said lever arms and said carrier members.

ERNST R. BERGMANN.